July 31, 1951
MAX GOLDSCHMIDT
NOW BY CHANGE OF NAME
MAC GOLDSMITH
RESILIENT BUSH OR BEARING
Filed Jan. 26, 1946
2,562,381
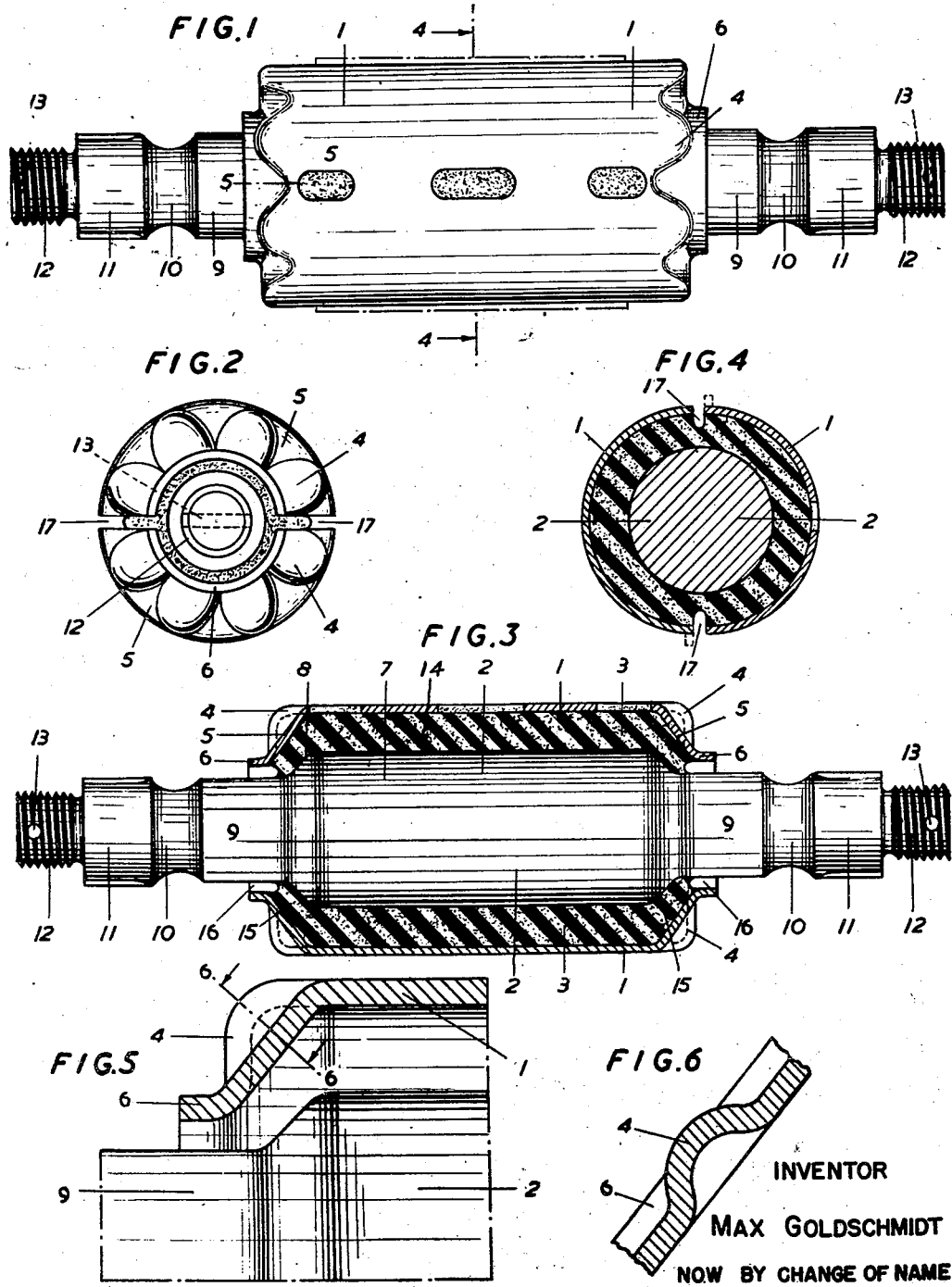
INVENTOR
MAX GOLDSCHMIDT
NOW BY CHANGE OF NAME
MAC GOLDSMITH
BY *Harness, Dickey & Pierce*
ATTORNEYS.

Patented July 31, 1951

2,562,381

UNITED STATES PATENT OFFICE 2,562,381

RESILIENT BUSH OR BEARING

Max Goldschmidt, now by change of name Mac Goldsmith, Leicester, England, assignor to Metalastik Limited, Leicester, England, a British company Application January 26, 1946, Serial No. 643,711
In Great Britain June 1, 1945

Section 1, Public Law 690, August 8, 1946
Patent expires June 1, 1965

2 Claims. (Cl. 287—85)

1

The present invention relates to resilient bushes or bearings of the kind in which an inner metal member and an outer metal member each of greater diameter in the central portion than at the ends are assembled in suitably spaced relationship and secured to one another by an insertion of rubber, surface bonded to them. In such a bush or bearing the metal members are sleeves with conical end walls and the rubber insertion is of greater thickness at the central portion, where it sustains most of the torsional stresses, than at the ends where its presence between the end walls of the sleeves resists axial displacement of either sleeve relatively to the other.

One of the applications of this bush is in connection with motor vehicles, the outer sleeve being secured in a spring eye and the inner sleeve being secured to a spring shackle or to a bracket fixed to a vehicle frame member, both sleeves being held so that they cannot rotate in their supports. The relative rotation of the two sleeves about the axis of the bush is resisted only by shear of the rubber. In this construction, relative movement of the sleeves in the direction of the axis of the bush is resisted mainly by a compressive component between the ends of the outer and inner sleeves where they overlap in a radial direction.

A bush or bearing in accordance with the present invention has the same general characteristics, but the rubber insertion is bonded directly to an attachment pin which has a central portion of large diameter relatively to its attachment ends and the rubber continues from the thicker central portion in an approximately conical or a radial formation to parts of less thickness around the smaller end parts of the pin which lie within the enclosing metal sleeve or shell (hereinafter called a shell) of the bush or bearing.

The central portion of the pin will usually be larger in diameter than the openings in the end walls of the enclosing metal shell and this shell is therefore divided by one, two, or more longitudinal slots, or by a circumferential slot, in order to facilitate the assembly of the pin and shell.

The appended drawings illustrate the invention:

Figure 1 is an elevation of a bush or bearing suitable for use in a vehicle spring eye.

Figure 2 is an end view thereof.

Figure 3 is a longitudinal section through the enclosing metal shell and the rubber, but with the attachment pin in elevation.

Figure 4 is a transverse section on line 4—4 of Figure 1.

2

Figure 5 is a sectional detail of the end wall of the shell on line 5—5 of Figure 1.

Figure 6 is a section on line 6—6 of Figure 5.

In these drawings 1 is the metal shell made up of two semi-cylindrical parts. 2 is the attachment pin, and 3 is the rubber insertion. In this construction the metal shell 1 is cylindrical for the greater part of its length and at the ends is pressed or otherwise formed with a series of outwardly curved parts 4 from a conical end wall 5 finishing in an annular edge 6 axially directed and projecting slightly beyond the remainder of the end wall. This is clearly seen in Figures 1, 3, 5 and 6.

The metal of the end walls of the shell may however be radially stiffened by indentations, waves, corrugations, or the like around the circumference where the cylindrical part meets the end walls.

The pin 2 has the central cylindrical part 7 of relatively larger diameter with conical shoulders 8 leading to the reduced cylindrical parts which lie partly within the shell and partly without. Beyond the part 9 at each end is an encircling groove 10 and outside this groove is a splined squared or other similar part 11 for engaging bushes within a bore in one of the ends of a spring bracket or like part. Finally, there is an externally screwed portion 12 for the reception of a securing nut outside which a split pin may be fitted in the hole 13, or some other nut-anchoring device may be provided.

The rubber insertion 3 has the long cylindrical part 14 of greatest thickness between the cylindrical shell wall 1 and the part 7 of the pin, and conical end portions 15 of reduced thickness leading into the axial portions 6 of the end walls of the shell. The peripheries of these portions 15 are preferably moulded of a re-entrant or concave shape as at 16, Figure 3, so that the rubber will not be compressed between the reduced parts 9 of the pin and the cylindrical openings within the parts 6 of the end walls of the shell.

The axial overlap of the shoulders 8 and the conical end walls 5 ensures a cooperative compressive action on the conical end portions of the rubber between them. The enlarged diameter of the central part of the pin is greater than the diameter of the openings in the ends of the sleeve, so as to afford radial overlap between the shoulders 8 and conical end walls 5 and thereby provide for direct compression of the end portions 15 of the rubber to resist endwise movement or axial thrust.

As a pin shaped as described cannot be inserted axially into the forks, or U-brackets, or arms on each side of the spring eye, the sides of these parts may be slotted so that the pin may be moved into position in a direction transverse to its axis. The pin may then be held securely in the side arms by any usual means. In one construction, the ends of the side arms are formed with holes larger than the pin ends 9, 10, 11 and with lateral entry slots of width just sufficient to admit these parts of the pin. Split bushes are then inserted between the pin and the holes in the arms, and a bolt which may register with the bush and the groove 10 in the pin clamps the end of each arm on to its bush and the bush on the pin.

The shell may be forced into the rolled over or forged eye on the master leaf of the spring in such a way that the rubber is pre-compressed in a radial direction, allowed for by the width of the slot or slots 17 Figure 2 between the parts of the shell, thereby improving the durability of the bush. This pre-compression should be sufficient to ensure that the bush does not rotate in the eye of the spring when the pin rotates relatively thereto. A maximum gripping effect can be obtained if the dimensions of the slot or slots in the shell, the free diameter of the shell and the diameter of the eye are such that the edges of the slots abut strongly when the bush is forced into the eye, or where the diameter of the shell is such that there is a force fit between the closed divided shell and the internal surface of the eye.

The edges of longitudinal slots in the metal shell may be outwardly flanged along their length, or at points along their length so as to engage complementary grooves or recesses in the eye of the spring whereby rotation of the sleeve in the eye is prevented positively.

I claim:

1. A resilient bearing bush for insertion into a bearing opening comprising an inner member in the form of a metal attachment pin having a central portion of larger diameter, attachment end portions of small diameter at the ends of the central portion, and shoulders joining each end portion to the central portion, an outer member in the form of an axially divided sleeve having its intermediate portion extending around the larger portion of the inner member in radially spaced relation thereto, said outer member extending axially beyond the shoulders of the inner member and having its end portions reduced in diameter to a diameter less than that of the central portion of the inner member so as to overlap radially the shoulders and encircle the attachment portions in radially spaced relation thereto, the inner and outer members jointly defining an annular space which is of greater radial width along the central portions of the inner and outer members than the radial width of the space between the ends of the outer member and said shoulders, and rubber substantially filling the annular space between the inner and outer members and bonded substantially throughout its length to the external surfaces of the central portion and shoulders of the inner member and to the internal surfaces of the intermediate and end portions of the outer member, the arrangement before insertion of the bush into the bearing opening being such that the divided outer member must be radially contracted in order to cause it to become concentric and insertable into the bearing opening, whereby the rubber will be precompressed and the outer member will be held tightly in the opening.

2. A resilient bearing bush for insertion into a bearing opening comprising an inner member in the form of a metal attachment pin having a central portion of larger diameter, attachment end portions of small diameter at the ends of the central portion, and shoulders joining each end portion to the central portion, an outer member in the form of an axially divided sleeve having its intermediate portion extending around the larger portion of the inner member in radially spaced relation thereto, said outer member extending axially beyond the shoulders of the inner member and having its end portions reduced in diameter to a diameter less than that of the central portion of the inner member so as to overlap radially the shoulders and encircle the attachment portions in radially spaced relation thereto, the inner and outer members jointly defining an annular space which is of greater radial width along the central portions of the inner and outer members than the radial width of the space between the ends of the outer member and said shoulders, and rubber substantially filling the annular space between the inner and outer members and bonded substantially throughout its length to the external surfaces of the central shoulder and attachment portions of the inner member and to the internal surfaces of the central and end portions of the outer member, the arrangement before insertion of the bush into the bearing opening being such that the divided outer member must be radially contracted in order to cause it to become concentric and insertable into the bearing opening, whereby the rubber will be precompressed and the outer member will be held tightly in the opening, said outer member having inwardly projecting stiffening protuberances in its end portions which provide auxiliary key engagements with the rubber.

MAX GOLDSCHMIDT,
Now by change of name, Mac Goldsmith.

REFERENCES CITED

The following references are of record in the file of this patent:

UNITED STATES PATENTS

| Number | Name | Date |
|---|---|---|
| 565,024 | O'Toole | Aug. 4, 1896 |
| 1,715,782 | Pickop | June 4, 1929 |
| 1,827,233 | Hughes | Oct. 13, 1931 |
| 2,362,008 | Hile | Nov. 7, 1944 |
| 2,367,861 | Goldschmidt et al. | Jan. 23, 1945 |

FOREIGN PATENTS

| Number | Country | Date |
|---|---|---|
| 481,337 | Great Britain | Mar. 9, 1938 |